United States Patent [19]

Sagady

[11] 4,124,318
[45] Nov. 7, 1978

[54] SPLINED ASSEMBLY WITH RETAINING RINGS

[75] Inventor: Daniel V. Sagady, Hemlock, Mich.

[73] Assignee: General Motors Corporation, Detroit, Mich.

[21] Appl. No.: 889,238

[22] Filed: Mar. 23, 1978

[51] Int. Cl.² .............................................. F16D 1/10
[52] U.S. Cl. ...................................... 403/14; 403/359
[58] Field of Search ................... 403/359, 326, 13, 14, 403/DIG. 7; 285/321

[56] References Cited

U.S. PATENT DOCUMENTS

| | | | |
|---|---|---|---|
| 3,531,144 | 9/1970 | Bizllia | 403/326 |
| 3,718,350 | 2/1973 | Klein | 285/39 |
| 3,832,076 | 8/1974 | Gehrke | 403/359 |
| 3,992,117 | 11/1976 | Ristou | 403/14 |

FOREIGN PATENT DOCUMENTS 1,394,532  2/1965  France ...................................... 403/359

OTHER PUBLICATIONS

Technical Literature with Description and Illustrations of 1976 British Leyland Drive Axle (2 pages).

*Primary Examiner*—Andrew V. Kundrat
*Attorney, Agent, or Firm*—F. J. Fodale

[57] ABSTRACT

Male and female splined members are axially retained by an external split retaining ring at the accessible side of the female member and an internal split retaining ring occupying confronting grooves in the male and female members. The male and female members are disassembled by removing the external split retaining ring, over-inserting the male member to permit self expansion of the internal split retaining ring into a capturing release groove of the female member, and withdrawing the male member.

2 Claims, 6 Drawing Figures

SPLINED ASSEMBLY WITH RETAINING RINGS

This invention relates generally to splined assemblies having one or more split retaining rings to retain the female member on the male member in the axial direction and more particularly to such splined assemblies in which the female member has a blind side.

The U.S. Pat. No. 3,832,076 of Aug. 27, 1974 to Glenn F. Gehrke for a Splined Assembly with Retaining Rings proposes a device which can be assembled or disassembled when only one side of the female member is accessible. The Gehrke device utilizes a single split retaining ring which occupies confronting grooves in the male and female members respectively. The female member has assembly ramps at the entrance to its splined bore which squeeze the split retaining ring into a non-interfering position in the groove of the male member during assembly. The groove in the female member also has ramps on one side which squeeze the split retaining ring to the non-interfering position responsive to a predetermined disassembly force to permit disassembly.

The U.S. Pat. No. 3,992,117 of Nov. 16, 1976 to Theodore F. Ristau for a Shaft Retaining Ring proposes a similar device. In the Ristau device, the male member has an end assembly ramp and disassembly ramps on one side of its retaining groove which expand a split retaining ring into a non-interference position in the female retaining groove during assembly and disassembly respectively. The Ristau split retaining ring also has specially shaped ends for centering.

In both of the above devices, the axial retention in the assembly direction is positive since the split retaining ring operates against flat perpendicular side walls of the grooves. The axial retention in the disassembly direction, however, is much less since the split retaining ring operates against ramps on one side of one of the retaining grooves and releases responsive to a predetermined disassembly force. In many instances the above devices are satisfactory. However in other instances, a positive retention in both directions is desirable.

The object of this invention is to provide a splined assembly having a female member which is accessible form only one side in which the axial retention of the female member in both directions is positive while permitting assembly and disassembly from the one accessible side.

Other objects and features of the invention will become apparent to those skilled in the art as the disclosure is made in the following detailed description of a preferred embodiment of the invention as illustrated in the accompanying sheet of drawing in which.

Figure 1:
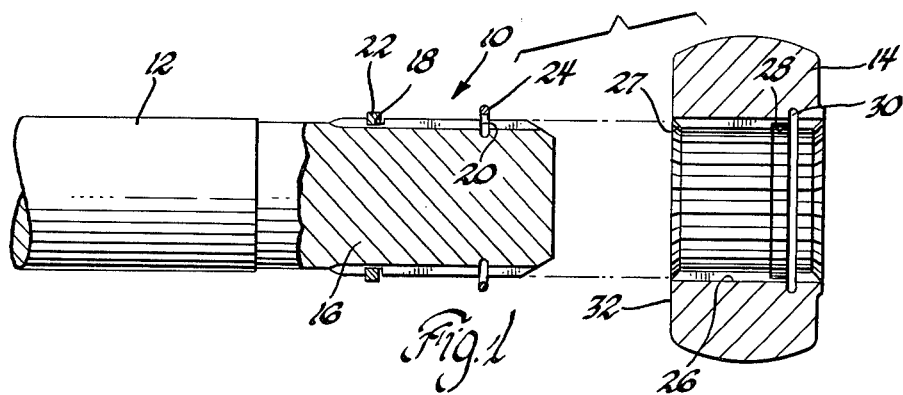
FIG. 1 is a view, partially in section, of a partially assembled splined assembly with retaining rings in accordance with this invention.

Referring now to the drawing and particularly FIG. 1, the splined assembly 10 comprises a male member 12 and a female member 14.

The male member 12 is in the form of a shaft having a splined end portion 16 having axially spaced circular grooves 18 and 20. The diameter of the groove 18 is slightly greater than the minor diameter of the splines and is sized such that a split retaining ring 22 of rectangular section when installed fits snugly on the diameter of the groove. The diameter of the groove 20 is less than the minor diameter of the shaft splines by about twice the section diameter of a split retaining ring 24 of circular section. This permits compression of the split retaining ring 24 into the groove 20 to a non-interfering position radially inward of the cooperating female member splines during assembly. The free ring diameter of the split retaining ring 24 is such that it slides freely on the splined end portion 16 of the male member 12. The side walls of the groove 20 are parallel and perpendicular to the axis of the male member 12.

The female member 14 is in the form of a longitudinal grooved annulus or race typical of an inner drive member for a ball and groove type universal joint. The female member 14 has a splined bore 26 with a lead-in chamfer 27. The splined bore 26 also has juxtaposed circular grooves 28 and 30 axially spaced from the side face 32 surrounding the lead-in chamfer 27. The groove 28 is a retention groove and has a diameter which is less than the major diameter of the bore splines. The side wall of the retention groove 28 toward the side face 32 is flat and perpendicular to the axis of the splined bore. The other side of the retention groove 28 is open to the juxtaposed larger diameter groove 30. The groove 30 has a diameter which is larger than the major diameter of the splines by about twice the section diameter of the split retaining ring 24 so that it allows the split retaining ring 24 to self expand to a non-interfering position with respect to the splines of the male member 12. The side wall of the groove 30 remote from the side face 32 is flat and perpendicular to the axis of the splined bore and serves to capture the expanded split retaining ring 24.

The male and female members are assembled by installing the split retaining ring 22 in the groove 18 and positioning the split retaining ring 24 about the groove 20 of the male member 12 as shown in FIG. 1.

Figure 2:
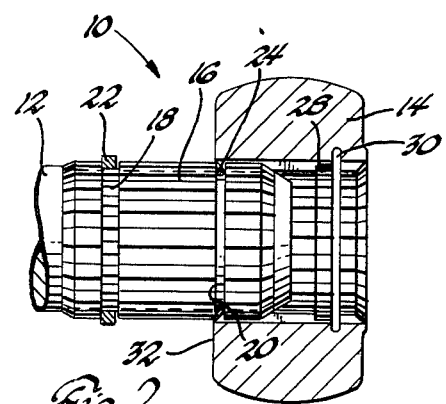
FIG. 2 is a similar view of the splined assembly in a later stage of assembly.
Figure 3:
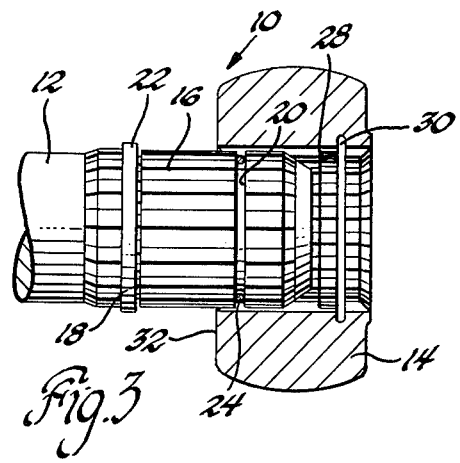
FIG. 3 is a similar view of the splined assembly in a still later stage of assembly.
Figure 4:
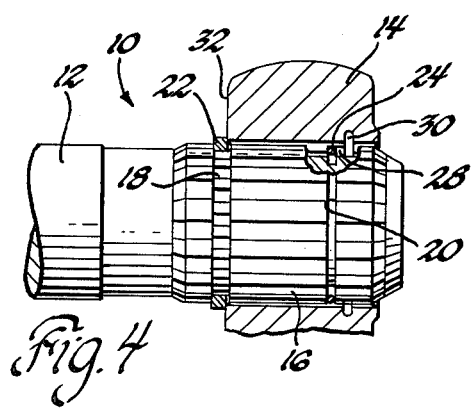
FIG. 4 is a similar view of a completely assembled splined assembly of the invention.

The split retaining ring 24 is then partially compressed into the groove 20 while the splined end 16 of the male member 12 is inserted into the splined bore 26 of the female member 14. When the split retaining ring 24 engages the chamfer 27 (FIG. 2) the split retaining ring 24 is further compressed deeper into the groove 20 to a noninterfering position with respect to the bore splines permitting continued insertion (FIG. 3). Insertion continues until the split retaining ring 22 engages the side face 32 of the female member 14 for positive retention in the assembly direction. In this position, the grooves 20 and 28 are aligned allowing partial expansion of the split retaining ring 24 against the diameter of the retaining groove 28 to an interference position where the split retaining ring 24 occupies both grooves 20 and 28 preventing pull-out of the male member 12. The axially retained position of the parts is shown in FIG. 4 and it should be noted that the split retaining ring 24 operates against side walls of the grooves 20 and 28 which are both flat and perpendicular to the axis of their respective members in preventing pull-out thus also providing a very positive retention in the disassembly direction.

Figure 5:
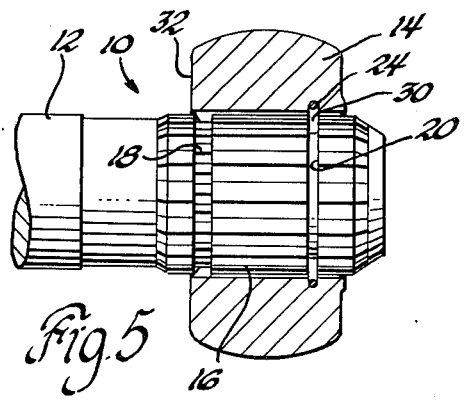
FIG. 5 is a similar view of the splined assembly in a stage of disassembly.
Figure 6:
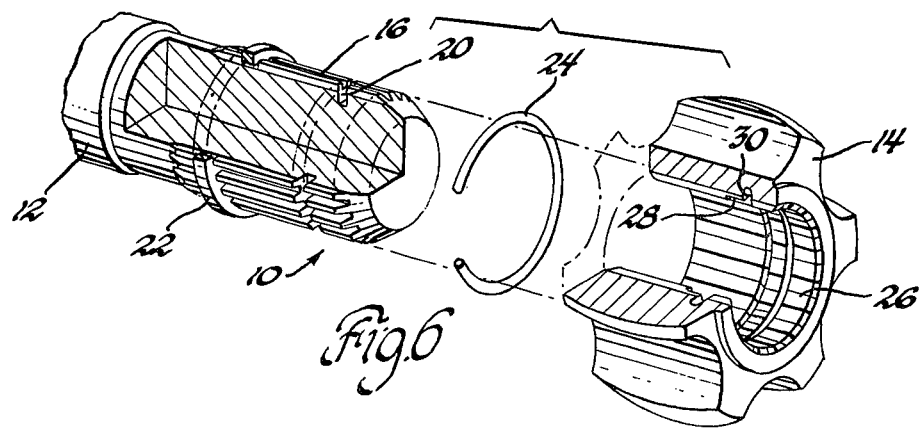
FIG. 6 is an exploded perspective view of the splined assembly of the invention.

In order to disassemble the parts, the split retaining ring 22 is removed. The male member 12 is inserted further into the female member 14 a short distance until the groove 20 aligns with the groove 30. When the grooves 20 and 30 are aligned, the split retaining ring self expands into a captured position within the groove 30 where the split retaining ring 24 does not interfere with the splines of the male member 12 (FIG. 5). The male member 12 is then simply withdrawn and the split retaining ring 24 is subsequently retrieved from the capturing release groove 30.

I wish it to be understood that I do not desire to be limited to the exact details of construction shown and described, for obvious modifications will occur to a person skilled in the art.

What is claimed is:

1. A splined assembly with retaining rings comprising,
    a male part having a splined portion, a first retaining groove, and a second retaining groove spaced axially therefrom,
    a female member having a splined bore mating with the splined portion of the male member and a side face surrounding the splined bore at one end, said splined bore having a retention groove spaced axially from said side face and a release groove located on the side of the retention groove remote from said side face,
    a removable split retaining ring disposed in the first retaining groove of the male member and engaging the side face of the female member for limiting insertion of the male member into the female member and aligning the second retaining groove of the male member with the retention groove of the female member,
    a second split retaining ring disposed in the second retaining groove of the male member and the retention groove of the female member under radial compression for preventing withdrawal of the male member from the female member,
    said male member being further insertable into the female member upon removal of the split retaining ring to a disassembly position where the second split retaining ring aligns with the release groove and self expands out of the second retaining groove into the release groove to permit withdrawal of the male member from the female member.

2. A splined assembly with retaining rings comprising,
    a male member having a splined portion, a first retaining groove and a second retaining groove spaced axially therefrom, said second retaining groove having parallel side walls which are perpendicular to the axis of the male member,
    a female member having a splined bore mating with the splined portion of the male member and a side face surrounding the splined bore at one end, said splined bore having a retention groove spaced axially from said side face and a juxtaposed release groove located at the side of the retention groove remote from said side face, said retention groove having a side wall at the side toward said side face which is perpendicular to the axis of the splined bore and said release groove having a side wall at the side remote from said side face which is perpendicular to the axis of the splined bore,
    a removable split retaining ring disposed in the first retaining groove of the male member and engaging the side face of the female member for axially retaining the male and female members in the assembly direction and aligning the second retaining groove of the male member with the retention groove of the female member,
    a second split retaining ring disposed in the second retaining groove of the male member and the retention groove of the female member under radial compression for axially retaining the male and female members in the disassembly direction,
    said male member being further insertable into the female member upon removal of the split retaining ring to a disassembly position where the second split retaining ring self expands out of the second retaining groove of the member and is captured by the release groove to permit withdrawal of the male member from the female member.

* * * * *